Dec. 20, 1966   F. F. BORKMANN   3,292,209
LABELING APPARATUS
Filed Dec. 10, 1963   4 Sheets-Sheet 1
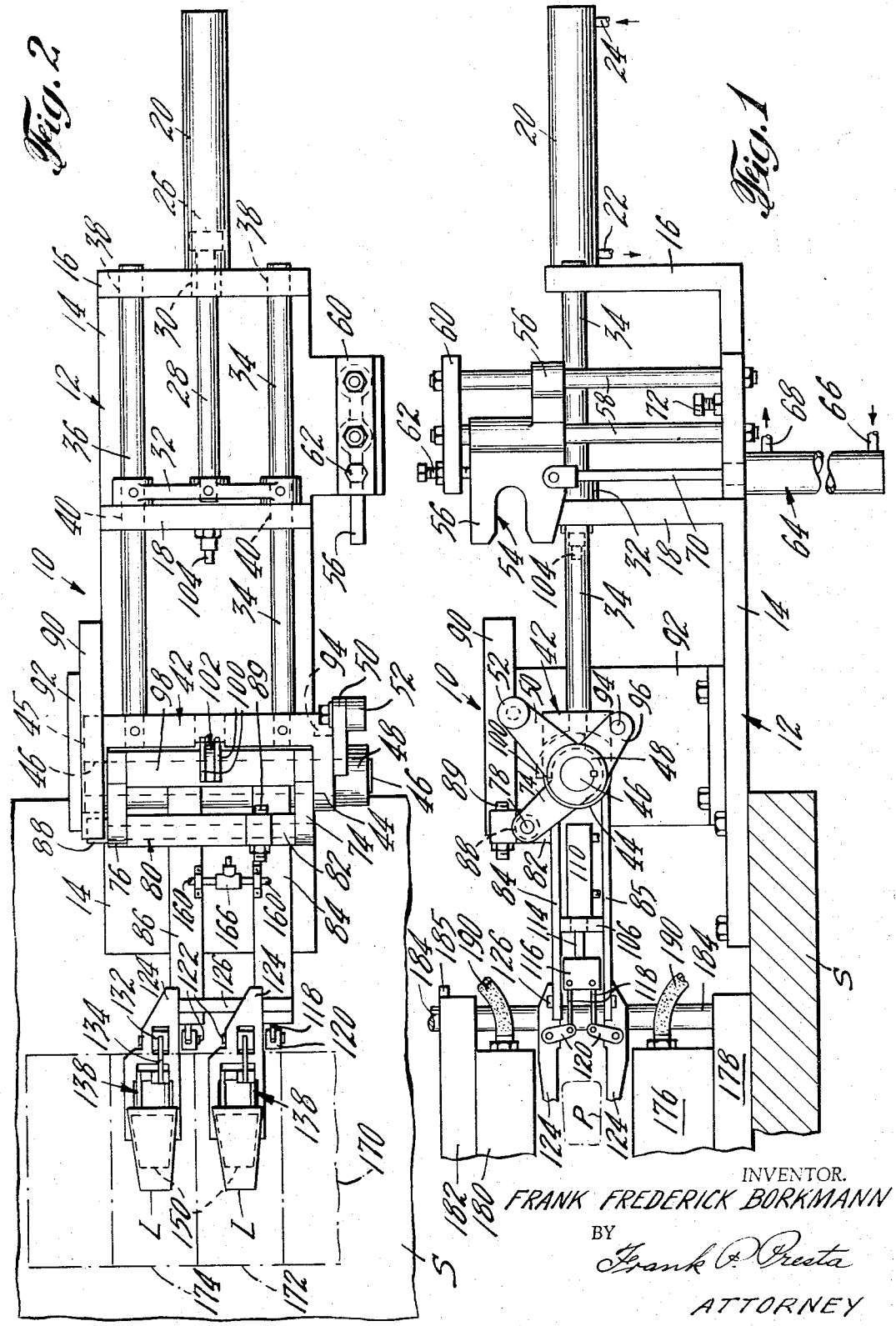
INVENTOR.
FRANK FREDERICK BORKMANN
BY
Frank P. Presta
ATTORNEY

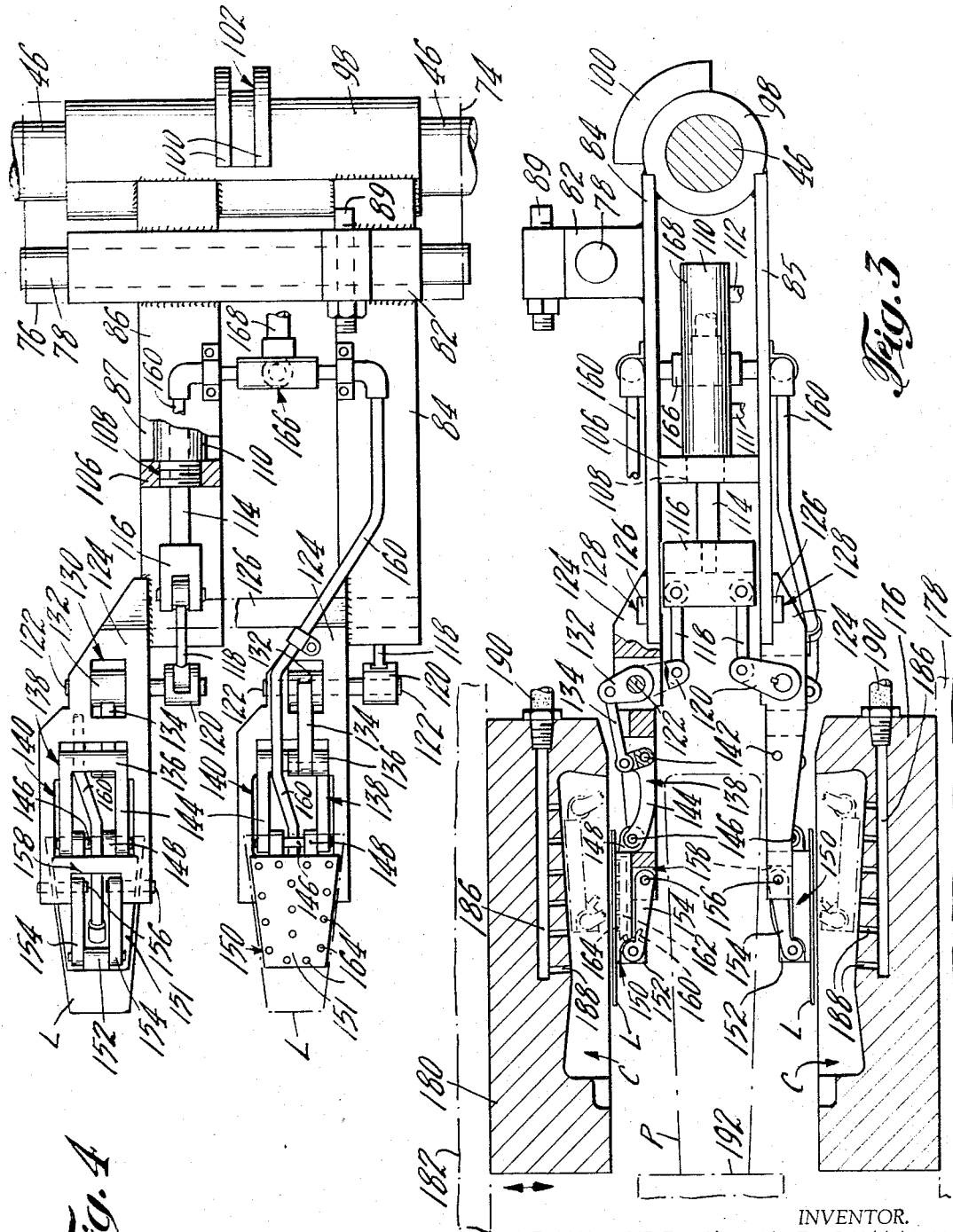

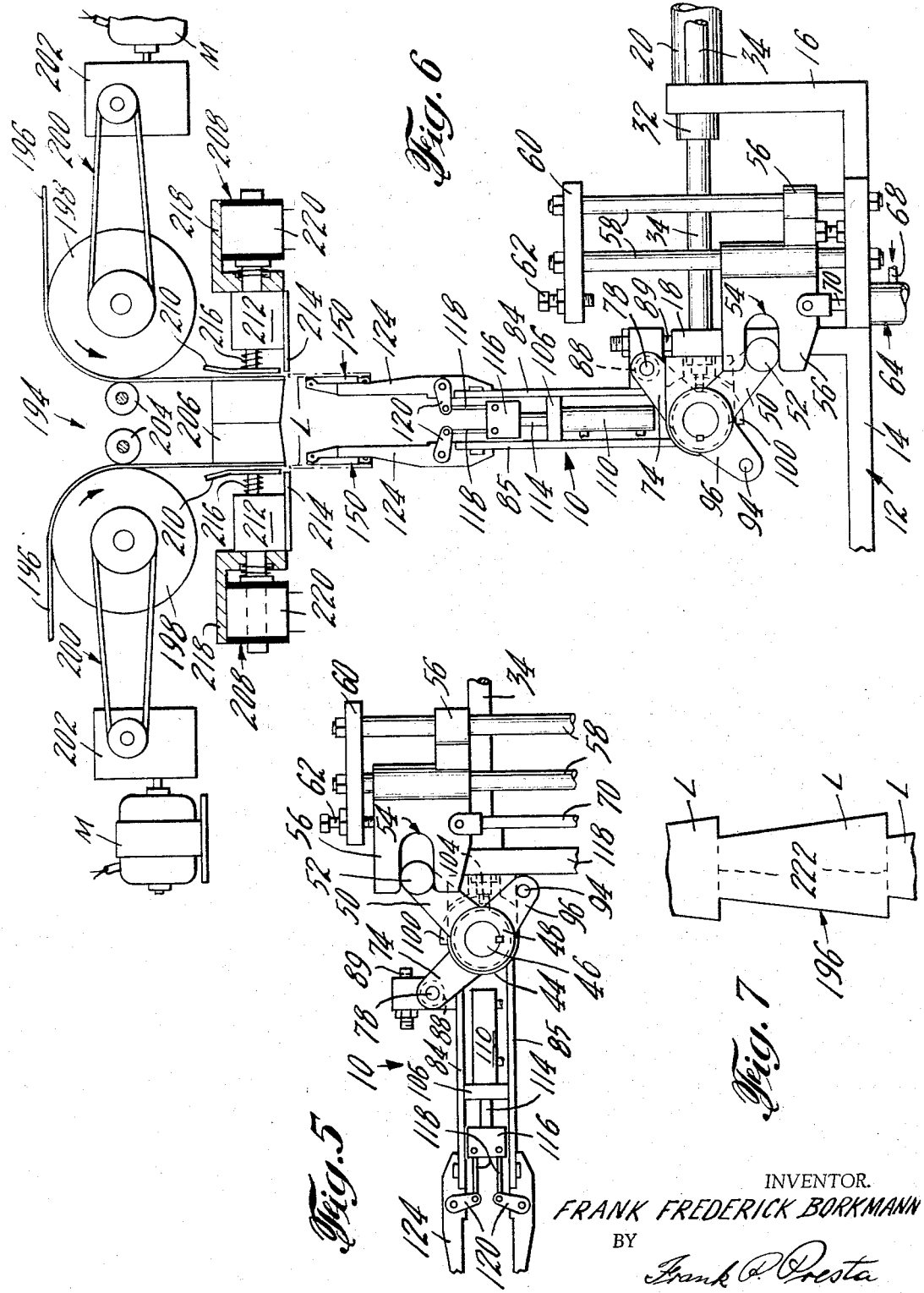

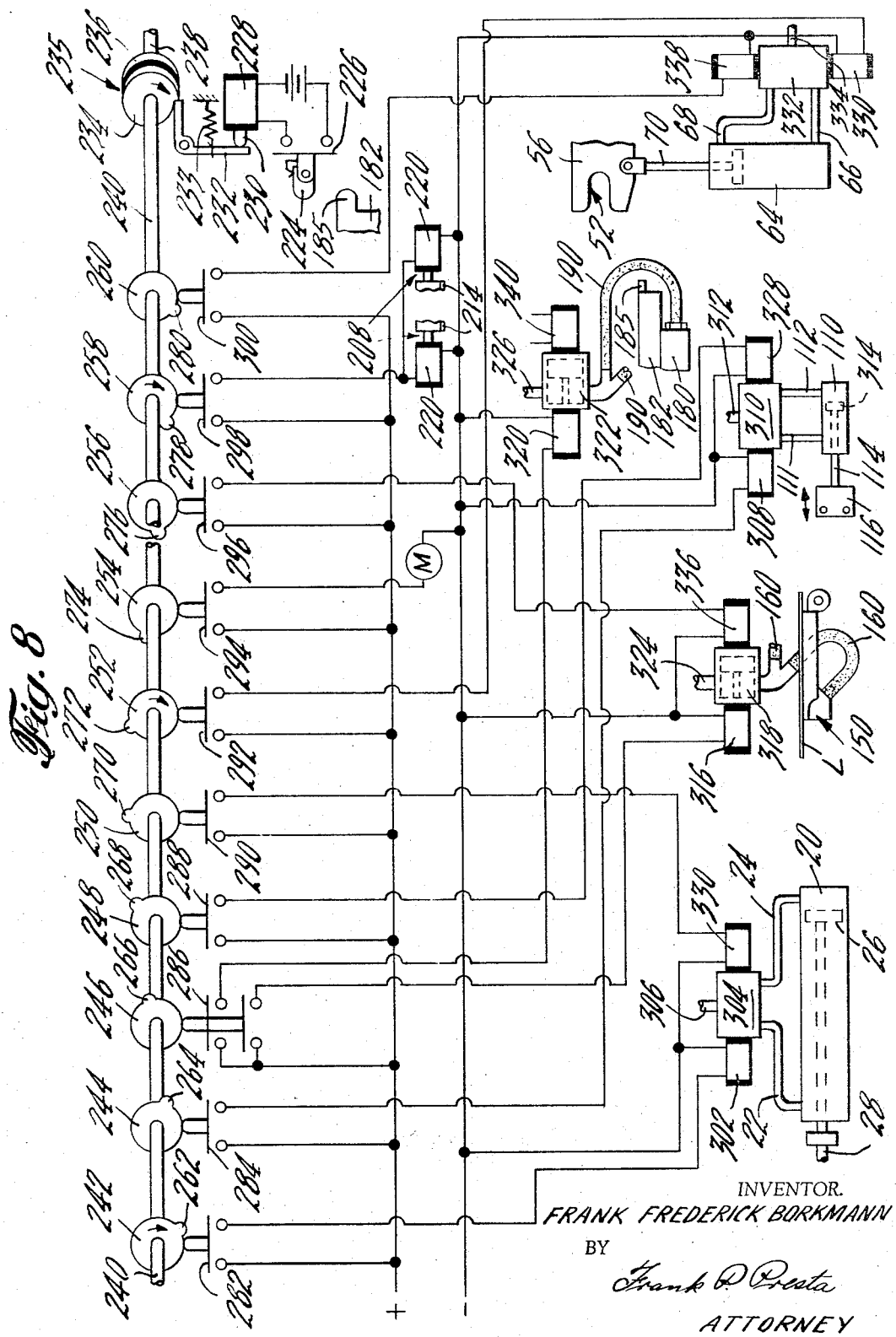

United States Patent Office 3,292,209
Patented Dec. 20, 1966

3,292,209
LABELING APPARATUS
Frank Frederick Borkmann, Union, N.J., assignor to American Can Company, New York, N.Y., a corporation of New Jersey
Filed Dec. 10, 1963, Ser. No. 329,435
4 Claims. (Cl. 18—5)

The present invention relates to the labeling of blown plastic containers and more particularly to apparatus for conveying a label to a blow mold and for inserting the label in the blow mold prior to the inflating of a semi-molten parison therein so that the label is fused or affixed to the outer surface of the blown container as it is formed from the parison.

It is current practice to manufacture hollow articles by blowing the same in a mold from semi-molten parisons of material having the physical properties of polyethylene or other polyolefins. It is, however, normally quite difficult to effect the adhesion of ink, other imaging material or label adhesive to the blown container after it has been removed from the mold and allowed to harden, with the result that serious problems are encountered in the production of attractively finished and decorated or labeled blown containers.

In some instances, printed label legends have been applied by means of heated dies which may print through inked ribbons. In other instances, labels have been secured by treating the container surface after completion in one of various known ways to render it receptive to printing inks or adhesive materials, thus making it possible to either print the label directly on the outside surface of the container or to apply an adhesive coated label thereto. These methods, however, all have serious deficiencies in that they require additional operations subsequent to the blow molding operation, frequently result in containers which are relatively unattractive in appearance, and in many instances are limited to the production of simple, single color label legends, especially when the container has an irregular shape.

One more promising method for attaching labels or other decoration of polyolefin material to containers of similar material involves the placing of the label in a blow mold prior to the inflation of a semi-molten parison therein, and then inflating the parison against the label so that the label becomes fused with or affixed to the blown container. Such a method is described in detail in United States Letters Patent 3,108,850, granted on October 29, 1963, to Roger Brandt and entitled "Labeling of Blown Plastic Containers." In order to fully exploit this method, however, it has become necessary to develop a suitable apparatus for conveying labels to the blow mold and for accurately positioning them on the interior surface of the blow mold.

It is an object of the present invention, therefore, to provide apparatus for rapidly and efficiently conveying a label of the above type to a blow mold and then inserting the label in the blow mold when it is in open position and prior to the inflating of a semi-molten parison therein.

Another object is to provide such an apparatus wherein the label is positively held during the conveying thereof so that it may be accurately positioned in a predetermined location in the open blow mold prior to the inflation of the parison therein.

A further object is the provision of such an apparatus which is capable of feeding a plurality of labels into the mold so that several surfaces of the container may be labeled.

A still further object is to provide apparatus for inserting a label in an open blow mold prior to the inflation of a semi-molten parison therein in a manner to avoid any damage to the label and to accurately position the label in the blow mold.

Still another object is to provide such a labeling apparatus which is capable of rapidly effecting the labeling of large numbers of blown containers so as to be adaptable to an assembly line operation.

Numerous other objects and advantages of the invention will be apparent as it is better understood from the following description, which, taken in connection with the accompanying drawings, discloses a preferred embodiment thereof.

Referring to the drawings:

FIG. 1 is an elevational view of a portion of the apparatus constructed according to the principles of the instant invention, with parts broken away and parts in section, showing the apparatus as the label transfer unit is inserted into open blow molds;

FIG. 2 is a plan view of the apparatus shown in FIG. 1, with parts broken away;

FIG. 3 is an enlarged elevational view of a portion of the apparatus shown in FIG. 1, with parts broken away and parts in section, showing details of the label transfer unit and of one of the blow molds;

FIG. 4 is a plan view of a portion of the apparatus shown in FIG. 3, with parts being broken away, showing further details of the label transfer unit;

FIG. 5 is an elevational view of the label transfer unit shown in FIG. 1, with parts being broken away, showing the transfer unit after it has been fully withdrawn from the blow molds;

FIG. 6 is an elevational view of a portion of the apparatus shown in FIG. 1, with parts broken away and parts in section, showing the transfer unit as it receives labels of a predetermined size from a label supplying unit;

FIG. 7 is an enlarged fragmentary view of a portion of one of the label strips shown in FIG. 6 prior to the cutting of a label therefrom; and FIG. 8 is a schematic view of the mechanical, electrical and hydraulic control system for synchronizing the movements of the various parts of the instant labeling apparatus.

As a preferred or exemplary embodiment of the instant invention, FIGS. 1 and 2 illustrate the label transfer unit 10 of the instant label conveying apparatus. The transfer unit 10 comprises a supporting frame 12 having a base member 14 rigidly attached to a supporting platform S and upstanding frame members 16, 18 rigidly mounted on the base member 14.

An actuating cylinder 20 is mounted at one end on the upper portion of the frame member 16 and is connected to a pair of hydraulic feed lines 22, 24. Slidably mounted for reciprocal movement in the cylinder 20 is a piston 26 having a piston rod 28 extending through an aperture 30 in the frame member 16 and rigidly connected to a transverse bracket 32. The bracket 32 is connected at one end to a rod 34 and at the other end to a rod 36 which is parallel to the rod 34. The rods 34 and 36 are slidably mounted in bearing apertures 38 and 40 in the frame members 16 and 18, respectively, and each of the rods 34, 36 has the end thereof remote from the frame member 16 secured to a U-shaped cross member 42.

The cross member 42 has legs 44, 45 extending forwardly therefrom in which is pivotally mounted a cross rod 46 (see FIG. 2). A hub 48 is keyed to the cross rod 46 adjacent one end thereof and has rigidly mounted thereon a radially extending arm 50 having a roller 52 rotatably mounted on the free end thereof. The roller 52 is in alignment with a complementary groove or slot 54 in a plate member 56 which is slidably mounted for vertical movement on a pair of parallel rods 58 having the lower ends thereof secured to the base member 14 of supporting frame 12. As shown in FIG. 1, the upper ends of the rods 58 have a plate 60 secured thereto which has mounted thereon an adjustable stop member 62 in vertical alignment with the plate member 56 to limit the vertical movement thereof and to insure the alignment of the groove 54 and roller 52 when the plate member 56 is in its uppermost position.

The vertical movement of the plate member 56 is controlled by a hydraulic piston and cylinder unit 64 which is secured to the base member 14 and in communication with a pair of hydraulic feed lines 66, 68. A piston rod 70, connected at one end to the piston (not shown) of the hydraulic unit 64 and extending upwardly through the base member 14, is connected at the other end thereof to the lower portion of the plate member 56. The downward movement of the plate member 56 is limited by an adjustable stop member 72 mounted on the base member 14 in vertical alignment with the plate member 56 (see FIG. 1).

A pair of brackets 74 and 76 are keyed at one end to the cross shaft 46 adjacent the legs 44 and 45, respectively, of the cross member 42. The other end of each of the brackets 74 and 76 carries the adjacent ends of a beam rod 78 which in turn is mounted in the bore 80 of a transverse beam 82 (see FIGS. 1 through 4). The transverse beam 82 is secured by welding or in any suitable manner to laterally aligned support plates 84 and 86, and has mounted on its upper surface an adjustable stop member 89 which serves a purpose to be described hereinafter. A roller 88 is rotatably mounted on the end of the beam rod 78 adjacent the bracket 76 and is in engagement with the undersurface of a flange 90 on an upstanding support member 92 rigidly mounted on the base member 14 of supporting frame 12. The roller 88 serves to limit the clockwise rotation of the cross rod 46 and thus that of the arm 50 which has its hub 48 keyed to the rod 46.

The counterclockwise rotation of the cross rod 46 is limited by a pin 94 (see FIG. 1) which engages with the undersurface of the cross member 42 and is mounted on a bracket member 96 keyed to the cross rod 46. When the label transfer unit 10 is in the position of FIG. 1, therefore, the roller 88 and the pin 94 maintain the arm 50 in the position shown wherein the roller 52 on the arm 50 is in horizontal alignment with the complementary groove 54 in the plate member 56.

As shown in FIGS. 3 and 4, a cylindrical pivot member 98 is mounted on the cross rod 46 between the brackets 74 and 76 and is rigidly attached by welding or in any other suitable manner to to the end portions of the support plates 84 and 86 and to the end portions of support plates 85 and 87 which are disposed below and are parallel to the support plates 84 and 86, respectively. The pivot member 98 is provided with a pair of radially extending, parallel flanges 100 which define a groove 102 therebetween. A pin 104 (FIG. 2) facing the groove 102 is mounted on the upstanding frame member 18 in alignment with the groove 102 and is of a size so as to be freely receivable in the groove 102, for a reason to be described hereinafter.

Rigidly mounted on and disposed between each of the pairs of support plates 84, 85 and 86, 87 is a transverse plate 106 having a threaded bore 108 in which a hydraulic cylinder 110 connected to hydraulic feed lines 111, 112 is mounted (see FIGS. 1 through 4). A piston (not shown) is slidably mounted in the cylinder 110 and is rigidly attached to one end of a piston rod 114 extending through the bore 108 in the transverse plate 106. The other end of the piston rod 114 is rigidly connected to a trunnion 116 upon which a pair of connecting rods 118 are pivotally mounted at one end thereof.

The other end of each of the rods 118 is pivotally mounted on one end of an adjacent second trunnion 120 having the other end thereof keyed to a pivot pin 122 which is rotatably mounted on the adjacent one of a pair of opposing base plates 124 of substantially identical construction. The base plates 124 are rigidly mounted in any suitable manner on the support plates 84, 85 and 86, 87 and are further supported in a predetermined relationship with respect thereto by transverse bars 126 which are disposed in complementary recesses 128 in the base plates 124 and are rigidly mounted on each of the pairs of support plates 84, 85 and 86, 87.

As shown in FIGS. 3 and 4, each pivot pin 122 extends through an aperture 130 in its respective base plate 124, and a third trunnion 132 is disposed in the aperture 130 and is mounted on and keyed to the pivot pin 122. A link 134 is pivotally mounted at one end on each of the third trunnions 132, and at the other end thereof, each link 134 is pivotally mounted on the hub 136 of a U-shaped bracket 138 which is disposed in a second and larger aperture 140 in each of the base plates 124. The hub 136 of the bracket 138 is rigidly secured to a second pivot pin 142 which extends through the aperture 140 and is pivotally mounted at each end on the respective base plate 124.

Each of the U-shaped brackets 138 is provided with slightly curved legs 144 which are connected at the free ends thereof by a third pivot pin 146 rigidly attached to each of the legs 144. Pivotally mounted on the third pivot pin 146 between the bracket legs 144 are a pair of hubs 148 which are rigidly attached to one end of a label supporting plate 150. The supporting plate 150 has a depending portion 152 at the other end thereof to which are pivotally mounted the ends of a pair of link members 154. The other ends of each of the link members 154 are pivotally mounted on a fourth pivot pin 156 which in turn is rigidly mounted on the adjacent base plate 124 and disposed on one side of an end recess 158 in the base plate 124.

In view of the foregoing description of the connections 118 through 148 and 152 through 156 between the trunnion 116 on piston rod 114 and each of the label supporting plates 150, it is apparent that movement of the trunnion 116 between the solid and broken line positions shown in FIG. 3 results in corresponding movement of the label supporting plates 150 between the solid and broken line positions shown in FIG. 3.

As particularly shown in FIGS. 3 and 4, a flexible hose or supply line 160 is connected at one end to the depending portion 152 of each of the label supporting plates 150, and each of the hoses 160 is in communication with a hollow interior portion 162 of its respective label supporting plate 150 (see FIG. 3). The outer or label supporting surface 151 of each supporting plate 150 is in communication with the interior portion 162 through a plurality of bores 164 therein and thus the supporting surface 151 of each plate 150 is in communication with one of the hoses 160. The hoses 160 are all connected through a connection 166 of any suitable construction to a common vacuum supply line 168 which in turn is connected to a suitable vacuum creating means, such as a vacuum pump (not shown).

A blow mold unit 170 is disposed adjacent the label transfer unit 10 and comprises a pair of blow molds 172 and 174 (see FIG. 2) which are in lateral alignment with the label supporting plates 150 which are mounted on the pairs of support plates 84, 85 and 86, 87, respectively (see FIGS. 1 through 3). While two pairs of label supporting plates 150 and thus two blow molds 172, 174 are disclosed in the drawings, it is noted that this is only for the purpose of illustration, and any convenient number of pairs of label supporting plates 150 may be utilized in the label transfer unit 10. The blow mold unit 170 preferably is mounted with other similar units on a turret (not shown) or other movable or conveying means which is indexed with the label transfer unit 10 in a manner to align each blow mold unit 170 with the transfer unit 10 at a predetermined time, to be described more fully hereinafter.

Each of the blow molds 172, 174 preferably comprises a stationary mold section or half 176 which is mounted on a base 178 supported by the supporting platform S and a movable mold section or half 180 which is mounted on a base 182. The base 182 is slidably mounted on a rod 184 extending transversely from and rigidly mounted on the base 178, and thus the base 182 and the mold section 180 thereon are movable toward and away from the stationary mold section 176 (see FIG. 1). Any suitable means (not shown) may be utilized to move the mold section 180 toward or away from the mold section 176 at predetermined times. A projection or finger 185 (FIG. 1) is provided on the base 182 for the movable mold section 180 for a purpose to be described hereinafter.

As shown in FIG. 3, the mold sections 176 and 180 are substantially identical in construction and each comprises a cavity or internal surface C of predetermined shape which defines approximately one-half of the container to be blown therein. Each mold section 176, 180 is provided with label holding means which are herein shown as comprising a longitudinal bore 186 which is provided in each of the mold sections 176 and 180 and is in communication with the cavity C through a plurality of transverse bores 188 which cover an area of the cavity C slightly less than that of a label to be applied to the blown container in each of the blow molds 172, 174. It is noted that each of the label supporting surfaces 151 on the plates 150 preferably has a shape corresponding to that of the interior surface or cavity C in the area of the bores 188. Each of the longitudinal bores 186 is connected to a vacuum supply line or hose 190 which in turn is connected to a suitable vacuum creating means (not shown).

A parison P (FIG. 3), produced, for example, by injection molding heated semi-liquid polyolefin material such as polyethylene in a suitable parison mold (not shown), is carried on the neck of a mold part 192 which is in communication with a suitable source of fluid pressure (not shown). The parison P is insertable between the separated mold sections 176 and 180 and between the adjacent base plates 124 of the label transfer unit 10, and preferably is cool enough to be momentarily self-supporting and hot enough to remain unset and expansible in response to internal fluid pressure conveyed thereto through the mold part 192 in a conventional manner.

A label supplying unit 194 is illustrated in FIG. 6 and comprises, for each pair of label supporting plates 150, supplying means (not shown) for supplying continuous strips 196 of labels L of predetermined shape (see FIG. 7) to a pair of driven rolls 198. Each of the rolls 198 is driven by any suitable means such as a motor M through a suitable pulley and belt arrangement 200 and a gear box 202 to advance the label strip 196 thereon between it and an adjacent idler roll 204. The strips 196 are then advanced downwardly on both sides of a center support 206.

On each side of the center support 206 there is provided a label clamping and cutting mechanism 208 which comprises a clamping member 210 slidably mounted on a cutting member 212 having a cutting knife 214 rigidly mounted on the undersurface thereof. The clamping member is resiliently urged towards the center support 206 by any suitable means such as a coil spring 216. The cutting member 212 is slidably mounted on a bracket 218 for reciprocal movement toward and away from the center support 206, and this reciprocal movement is controlled by a solenoid unit 220 mounted on the bracket 218. Each of the clamping and cutting mechanisms 208 is controlled in a manner to be described hereinafter such that each of the strips 196 is clamped against the center support 206 and cut adjacent the bottom of the center support 206 when a length of strip 196 equal to a label L advances past the bottom of the center support 206 so that a line of severance 222 (FIG. 7) separating the labels L in the strip 196 is in alignment with the adjacent cutting knife 214.

It is noted that the labels L may be of the type which are to be completely affixed or fused to the blown container formed from the parison P, or may be of the transfer type wherein predetermined indicia are provided on a transfer base and only the indicia are transferred to the blown container as it is formed from the parison P.

If the labels L are of the completely bonded type, the material used for the strips 196 of labels L preferably is an olefin polymer or copolymer characterized by a low softening point or being compoundable with other resins or waxes to give a desired softening point, such that it can be activated by heat to fuse with or adhere to polyolefin compositions at lower temperatures than ordinary branched polyethylene. Examples of such a material are a copolymer of ethylene and vinyl acetate marketed under the trademark Elchem 1447C which may, if desired, be compounded with minor proportions of microcrystalline wax, ester gum, rosin, terpenes and the like; and a low molecular weight branched polyethylene having a molecular weight of about 8000, one sold under the trademark Epolene C, compoundable with minor proportions of terpenes or microcrystalline wax to give a desired softening temperature. Reference may be had to the aforementioned United States Letters Patent 3,108,850 for further details regarding a suitable label.

If the labels L are of the transfer type, the strips 196 preferably comprise a transfer base of a suitable type of fluid absorbing material such as paper with indicia thereon formed of a suitable ink which will adhere to the olefin material of the container as it is blown thereagainst from the parison P.

Referring now to FIG. 8, which illustrates in schematic form the control system for the instant apparatus, the upward movement of each movable mold section 180 and its base 182 on the rod 184 advances the projection 185 upwardly into engagement with a lever 224. The resulting lateral movement of the lever 224 closes a switch 226 which in turn actuates a solenoid 228 to move a solenoid plunger 230 laterally (to the left as seen in FIG. 8) into engagement with a pivotally mounted pawl 232. The pawl 232 is rotated by the plunger 230 in a clockwise direction against the force of a spring 233 connected thereto and thus is moved out of blocking engagement with the driven plate 234 of a one revolution slip clutch 235.

The slip clutch 235 further comprises a driving plate 236 rigidly mounted on a shaft 238 which is preferably continuously driven in a clockwise direction by any suitable drive means such as a motor (not shown). The driven clutch plate 234 is rigidly mounted on a rotatable timing shaft 240 which is rotated in a clockwise direction by the shaft 238 through the clutch 235 when the pawl is out of blocking engagement with the clutch plate 234. This rotation of the timing shaft 240 serves to begin a cycle of operation of the instant apparatus as will be described hereinafter.

As the mold sections 180 and the base 182 move upwardly away from the mold section 176, the label transfer unit 10 is in the retracted position shown in FIG. 5 wherein the roller 52 on the bracket 50 is disposed in the groove 54 of the plate member 56 and the pin 104 is disposed in the groove 102 defined by the flanges 100. At this point in the instant cycle of operation, a label L is mounted on the supporting surface 151 of each of the label supporting plates 150 and is retained thereon by a vacuum created in the hollow interior portion 162 and bores 164 of each plate 150 and supplied by one of the vacuum supply hoses 160 connected to each plate 150 (see FIG. 3).

As shown in FIG. 8, the timing shaft 240 has rigidly mounted thereon a plurality of spaced timing disks or wheels 242 through 260 having cams 262 through 280, respectively, mounted thereon. The timing disks 242 through 260 are so positioned on the timing shaft 240 that the cams 262 through 280 successively engage the operating members of switches 282 through 300, respectively, mounted adjacent thereto as the timing shaft 240 rotates through one revolution in a clockwise direction.

When the cam 262 on timing disk 242 engages and closes the switch 282, which may be of any suitable type or construction, a control solenoid 302 for a two-way valve 304 of any suitable construction is energized to shift the valve 304 in a manner to connect the feed line 24 with the fluid supply line 306. The piston 26 in cylinder 20, therefore, is moved towards the blow mold unit 170 (to the left as seen in FIGS. 2 and 8) to thus move the transverse bracket 32 into engagement with the frame member 18. This movement of the transverse bracket 32 results in a like movement of the rods 34, 36 and the U-shaped cross member 42 connected thereto to thereby position the label supporting plates 150 and labels L thereon within the open blow molds 172 and 174, as shown in FIGS. 1 through 3.

As the timing shaft 240 continues to rotate in a clockwise direction, the cam 264 on timing disk 244 engages and closes the switch 284 (FIG. 8) to energize a control solenoid 308 for a two-way valve 310 which controls the flow of fluid to the cylinder 110. The solenoid 308 causes the valve 310 to shift to a position wherein the feed line 112 (FIGS. 3 and 8) is connected to the fluid supply line 312. The piston 314 thus is moved in the cylinder 110 towards the blow mold unit 170 to thereby similarly move the trunnion 116 connected to the piston rod 114. This movement of the trunnion 116 to the broken line position of FIG. 3 causes each of the supporting plates 150 to move outwardly to the broken line position of FIG. 3 wherein the labels L on the supporting surfaces 151 are positioned over the transverse bores 188 in the internal surface or cavity C of each of the mold sections 176 and 180.

After this positioning of the labels L in the molds 172, 174, the cam 266 on timing disk 246 engages and closes the double switch 286 which is of any suitable or conventional construction. The closing of double switch 286 actuates the control solenoid 316 for the valve 318 connected by the hoses 160 to the supporting plates 150 and simultaneously actuates the control solenoid 320 for the valve 322 connected by the hoses 190 to the mold sections 176 and 180. The actuation of solenoid 316 closes the valve 318 to cut off the vacuum supply from the supply line 324 to the hoses 160, while the actuation of solenoid 320 opens the valve 322 to connect the vacuum supply line 326 with the hoses 190. The labels L, therefore, are released by the supporting plates 150 and are retained over the bores 188 in the cavity C of each of the mold sections 176 and 180.

It will be understood that the labels L may be held in the mold sections 176, 180 in any other suitable manner, as by providing the mold interiors with tacky surfaces which would temporarily hold the labels L in place therein, or by holding them in place by electrostatic attraction.

The supporting plates 150 then are moved inwardly to the solid line positions of FIG. 3, after the cam 268 on timing disk 248 engages and closes the switch 288 to energize a second control solenoid 328 for the valve 310 which shifts the valve 310 to a position wherein the feed line 111 (FIGS. 3 and 8) is connected to the fluid supply line 312. The piston 314 in cylinder 110 and the trunnion 116 thus are moved away from the blow mold unit 170 and, through the connections 118 through 148 and 152 through 156, the label supporting plates 150 are moved inwardly in response to the movement of the trunnion 116 and piston 314.

When the supporting plates 150 are moved to the solid line positions of FIG. 3, the cam 270 on timing disk 250 engages and closes the switch 290 to energize a second control solenoid 330 for the valve 304 to connect the feed line 22 to the fluid supply line 306 and move the piston 26 in the cylinder 20 away from the blow mold unit 170. This movement of the piston 26 results in like movement of the bracket 32, the rods 34, 36 and the cross member 42 to thus withdraw the label supporting plates 150 from the open blow molds 172 and 174. The label transfer unit 10, therefore, again assumes the retracted position shown in FIG. 5 wherein the roller 52 is disposed in the groove 54 and the pin 104 is disposed in the groove 102 defined by the flanges 100.

Prior to, during or after the removal of the supporting plates 150 from the open molds 172, 174, a hollow parison P is inserted in any suitable manner into each of the open molds 172, 174, and the movable mold section 180 of each mold is moved towards the opposing mold section 176 by any suitable control means (not shown) to close the molds 172 and 174. Fluid pressure then is conveyed in any suitable or conventional manner through the mold parts 192 to expand each parison P into container forming and sizing contact with the defining surfaces of the cavities C in the mold sections 176 and 180 to form a container (not shown) of polyolefin material in each of the closed molds 172, 174.

The pressing or forcing of the parison P against the defining surfaces of the cavity C in each mold section 176, 180, while the parison material is still semi-molten or formable and at an elevated temperature, results in firm contact between the parison P and each of the labels L disposed over the transverse vacuum bores 188 in each of the mold sections 176, 180. The labels L in the molds 172, 174, therefore, are fused with or firmly affixed to the polyolefin material of the container formed from the parison P in each of the molds 172, 174. It is noted that if the label L is of the transfer type described above, then only the indicia on the interior surface of the transfer base will be transferred to the blown container surface instead of the entire label L becoming adhered thereto.

While the molds 172 and 174 are being closed or while the parisons P are being expanded therein after the molds are closed, the cam 272 on timing disk 252 rotates into engagement with and closes the switch 292 to energize the control solenoid 330 which shifts the valve 332 to a position wherein the feed line 68 for the piston and cylinder unit 64 is in communication with the fluid supply line 334. The piston rod 70 and plate member 56 attached thereto thus are moved downwardly from the position shown in FIG. 5 to the position shown in FIG. 6, thus rocking the arm 50 downwardly and causing the label supporting plates 150 and the base plates 125 and support plates 84 through 87 therefor to rotate in a clockwise direction about the cross rod 46 to a substantially vertical position adjacent the label supplying unit 194. The motors M, through the gear boxes 202 and the pulley and belt arrangements 209, drive the rolls 198 which advance the label strips 196 thereon a predetermined distance beyond each center support 206 to the broken line positions shown in FIG. 6 wherein the end portion of each strip 196 is disposed over the adjacent label supporting plate 150 and the line of severance 222 thereof (FIG. 7) is disposed in alignment with the adjacent cutting knife 214.

The cam 276 on timing disk 256 then rotates into engagement with and closes the switch 296 to energize the control solenoid 336 which opens the valve 318 to connect the supporting plate hoses 160 to the vacuum supply line 324. The portion of the label strips 196 adjacent the supporting plates 150 thus are pulled against the supporting surfaces 151 of the plates 150 and retained thereon by the vacuum supplied to the interior portion 162 and bores 164 of each supporting plate 150.

As the timing shaft 240 continues to rotate, the cam 278 on timing disk 258 engages and closes the switch 298 to energize the control solenoids 220 for the clamping and cutting mechanisms 208 (see FIGS. 6 and 8). The clamping members 210 thus are moved into engagement with the strips 196 to yieldably clamp them against each center support 206 and, simultaneously, the cutting knives 214 sever a label L from each strip 196 at the line of severance 222 (FIG. 7). At this point, therefore, the supporting surface 151 of each plate 150 has a severed label L held thereon by the vacuum in the interior portion 162 thereof.

When the cam 280 on timing disk 260 engages and closes the switch 300, the control solenoid 338 is energized to shift valve 332 to a position wherein the feed line 66 for the piston and cylinder unit 64 is in communication with the fluid supply line 334 to move the piston rod 70 and plate member 56 attached thereto upwardly from the position of FIG. 6 to the position shown in FIG. 5, thus rocking the arm 50 upwardly and causing the label supporting plates 150, the base plates 124 and support plates 84 through 87 to rotate in a counter-clockwise direction about the cross rod 46 to the substantially horizontal position shown in FIG. 5 wherein the label supporting plates 150 again are in alignment with the blow molds 172 and 174.

While the supporting plates 150 are thus being moved to and from the label supplying unit 194 to receive labels L therefrom, the parisons P in the closed molds 172, 174 are expanded to form the blown containers therein and to cause the labels L in the molds 172, 174 to become fused with or firmly adhered to the blown containers, or, if the labels L are of the transfer type, to cause the transfer of the indicia from the transfer bases to the blown containers. The molds 172, 174 preferably are cooled in any suitable or conventional manner to harden or solidify the blown containers therein. Suitable control means (not shown) then actuate the solenoid 340 (FIG. 8) to close the valve 322 and cut off the vacuum supply to the hoses 190 connected to the mold sections 176, 180, and the mold sections 180 are moved upwardly away from the mold sections 176 to open the molds 172, 174. The hardened blown containers are removed from the open molds 172, 174 in any suitable manner and, if the labels L are of the transfer type, the transfer bases are also removed therefrom in any suitable manner. Thereafter, the projection 185 on the base 182 of mold section 180 engages the lever 224 for switch 226 to again begin the above described cycle of operation of the instant apparatus.

As an alternative, the molds 172, 174 with the labelled bottles therein may be moved from alignment with the label applying unit 10 and replaced by another pair of molds for the succeeding cycle. In this manner, the production of labelled containers may be speeded up.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for conveying a label from a label supplying means to the interior surface of a section of an open blow mold so that the label thereafter may be affixed to a container as it is blown from a parison within the blow mold when the latter is in a closed position comprising:
   a stationary supporting frame,
   an actuating cylinder held in a fixed position by said frame,
   a piston slideably mounted in said cylinder and having a piston rod,
   support means pivotally connected with said piston rod,
   rotating means to rotate said support means with respect to said piston rod,
   a label supporting plate having a label supporting surface of a shape corresponding to that of said section of said blow mold,
   vacuum means in communication with said label supporting surface for selectively retaining thereon a label received from said supplying means,
   a plurality of links pivotally connected to said support means and said label supporting plate,
   means to rotate said links to move said label supporting plate away from said support means,
   whereby said actuating cylinder is actuated to withdraw said support means from said blow mold, and thereafter said rotating means rotates said support means so that said label supporting plate is in close proximity with said label supplying means, and thereafter said vacuum means is actuated to retain on said label supporting surface a label supplied by said label supplying means, and thereafter said rotating means is rotated to move said means away from said label supplying means, and thereafter said actuating cylinder is actuated to move said support means and said label supporting plate in the direction of the longitudinal axis of said blow mold and into said blow mold and thereafter actuating said means to rotate said links to move said label supporting plate away from said support means to place said label against said section of said open blow mold, and then deactivating said vacuum means to allow said label to be retained of said surface of said blow mold, and then actuating said means to rotate said links to move said label supporting plate away from said surface of said blow mold, and then actuating said cylinder to withdraw in the direction of the longitudinal axis of said blow mold the support means and said label supporting plate from said blow mold.

2. The apparatus defined in claim 1 wherein said actuating cylinder is a hydraulic cylinder.

3. The appartus defined in claim 2 wherein said rotating means includes a hydraulic cylinder.

4. The apparatus defined in claim 3 wherein said means to rotate said links includes a hydraulic cylinder.

References Cited by the Examiner

UNITED STATES PATENTS

| | | | |
|---|---|---|---|
| 2,684,775 | 7/1954 | Von Hofe | 156—521 |
| 2,768,106 | 10/1956 | Sartakoff | 156—293 |
| 2,853,737 | 9/1958 | Harlow | 18—5.3 |
| 3,072,969 | 1/1963 | Du Bois | 264—94 |
| 3,186,029 | 6/1965 | Joseph | 18—5.3 |
| 3,207,822 | 9/1965 | Makowski | 18—5 X |

J. SPENCER OVERHOLSER, *Primary Examiner.*

EARL F. BERGERT, *Examiner.*

H. F. EPSTEIN, W. L. McBAY, *Assistant Examiners.*